(12) United States Patent
Niizumi et al.

(10) Patent No.: US 12,542,128 B2
(45) Date of Patent: Feb. 3, 2026

(54) LEARNING APPARATUS, CONVERSION APPARATUS, LEARNING METHOD AND PROGRAM

(71) Applicant: NTT, Inc., Tokyo (JP)

(72) Inventors: Daisuke Niizumi, Musashino (JP); Kunio Kashino, Musashino (JP); Yasunori Oishi, Musashino (JP); Daiki Takeuchi, Musashino (JP); Noboru Harada, Musashino (JP)

(73) Assignee: NTT, Inc., Tokyo (JP)

( * ) Notice: Subject to any disclaimer, the term of this patent is extended or adjusted under 35 U.S.C. 154(b) by 134 days.

(21) Appl. No.: 18/690,377

(22) PCT Filed: Jul. 5, 2022

(86) PCT No.: PCT/JP2022/026739
§ 371 (c)(1),
(2) Date: Mar. 8, 2024

(87) PCT Pub. No.: WO2023/042528
PCT Pub. Date: Mar. 23, 2023

(65) Prior Publication Data
US 2025/0131914 A1 Apr. 24, 2025

(30) Foreign Application Priority Data

Sep. 17, 2021 (WO) .................. PCT/JP2021/034318

(51) Int. Cl.
*G10L 15/00* (2013.01)
*G10L 15/02* (2006.01)
(Continued)

(52) U.S. Cl.
CPC ............ *G10L 15/063* (2013.01); *G10L 15/02* (2013.01); *G10L 15/16* (2013.01)

(58) Field of Classification Search
CPC ....... G10L 15/16; G10L 19/005; G10L 19/00; G10L 25/27; G10L 25/30; G10L 15/02;
(Continued)

(56) References Cited

PUBLICATIONS

S. Hershey et al., "CNN architectures for large-scale audio classification", 2017 IEEE International Conference on Acoustics, Speech and Signal Processing (ICASSP), 2017, pp. 131-135, doi: 10.1109/ICASSP.2017.7952132.
(Continued)

*Primary Examiner* — Vu B Hang

(57) ABSTRACT

An aspect of the present invention provides a learning device including: a neural network that converts an acoustic time series that is a time series representing a sound into feature data expressed in a predetermined format required by a downstream task; and an update unit that updates the neural network on the basis of an execution result of the downstream task using the feature data, in which the neural network includes: a feature extraction unit that converts an input acoustic time series into an intermediate feature tensor that is a third-order tensor indicating features of the acoustic time series and is a tensor having time, frequency, and channel; and an intermediate network that executes processing of converting a representation of the intermediate feature tensor into a representation of a second-order tensor having time and direct product amounts that are amounts indicating a direct product of frequency and channel, and processing of acquiring, for each direct product amount of the second-order tensor, a one-dimensional vector indicating a statistic in a time axis direction of each direct product amount as the feature data.

13 Claims, 13 Drawing Sheets

(51) Int. Cl.
 *G10L 15/06* (2013.01)
 *G10L 15/16* (2006.01)
(58) Field of Classification Search
 CPC ....... G10L 15/063; G10L 15/07; G10L 15/08;
  G10L 15/22; G10L 15/26; G10L 15/30;
   G10L 15/1815; G10L 15/14; G10L
    15/197; G10L 17/26; G10L 17/00; G10L
     17/02; G10L 17/04; G10L 17/06
 See application file for complete search history.

(56) References Cited

PUBLICATIONS

Kong et al., "PANNs: Large-Scale Pretrained Audio Neural Networks for Audio Pattern Recognition", in IEEE/ACM Transactions on Audio, Speech, and Language Processing, vol. 28, pp. 2880-2894, 2020, doi: 10.1109/TASLP.2020.3030497.

|  |  | E101 | E102 | E103 | E104 |
|---|---|---|---|---|---|
|  |  | VGGish | | PANNs Cnn14 | |
| DOWNSTREAM TASK | | ORIGINAL | +GATP | ORIGINAL | +GATP |
| US8K | ENVIRONMENTAL SOUND IDENTIFICATION | 74.5% | 80.1% | 82.0% | 84.0% |
| SPCV2 | VOICE IDENTIFICATION | 14.3% | 82.6% | 51.4% | 56.4% |
| VoxCeleb1 | SPEAKER IDENTIFICATION | 11.1% | 41.4% | 8.0% | 9.1% |
| NSynth | MUSICAL INSTRUMENT SOUND IDENTIFICATION | 53.6% | 71.1% | 66.0% | 69.2% |
| Surge | MUSICAL SCALE IDENTIFICATION | 8.9% | 24.8% | 10.4% | 14.6% |

| Representation | SER tasks | | NOSS tasks | | | | Music tasks | | | |
| --- | --- | --- | --- | --- | --- | --- | --- | --- | --- | --- |
| | ESC-50 | US8K | SPCV2 | VC1 | VF | CRM-D | GTZAN | NSynth | Surge | Avg. |
| VGGish | 68.2 | 75.1 | 14.3 | 9.0 | 75.7 | 44.4 | 75.3 | 53.9 | 8.8 | 47.2 |
| VGGish-Fusion#10#15 | 86.5 | 80.9 | 91.4 | 54.5 | 91.6 | 59.3 | 70.8 | 73.6 | 33.3 | 71.3 |
| difference | +18.2 | +5.8 | +77.1 | +45.5 | +16.0 | +15.0 | -4.5 | +19.7 | +24.5 | +24.1 |
| CNN14 | 90.1 | 82.0 | 51.4 | 8.0 | 75.0 | 50.7 | 79.7 | 66.0 | 10.4 | 57.0 |
| CNN14-Fusion#3#6 | 93.0 | 85.8 | 91.3 | 50.6 | 90.5 | 59.0 | 77.4 | 73.8 | 32.4 | 72.6 |
| difference | +2.9 | +3.8 | +39.9 | +42.7 | +15.5 | +8.3 | -2.3 | +7.8 | +22.0 | +15.6 |
| AST | 93.5 | 85.5 | 71.8 | 16.5 | 81.2 | 57.9 | 84.3 | 73.2 | 25.8 | 65.5 |
| AST-Fusion#5#12 | 94.2 | 85.5 | 80.4 | 24.9 | 87.6 | 60.7 | 82.9 | 77.6 | 34.6 | 69.8 |
| difference | +0.6 | +0.0 | +8.6 | +8.4 | +6.4 | +2.8 | -1.4 | +4.5 | +8.9 | +4.3 |

FIG. 15

LEARNING APPARATUS, CONVERSION APPARATUS, LEARNING METHOD AND PROGRAM

CROSS-REFERENCE TO RELATED APPLICATIONS

This application is a 371 U.S. National Phase of International Application No. PCT/JP2022/026739, filed on Jul. 5, 2022, which claims priority to Japanese Patent Application No. PCT/JP2021/034318, filed Sep. 17, 2021. The entire disclosures of the above applications are incorporated herein by reference.

TECHNICAL FIELD

The present invention relates to a learning apparatus, a conversion apparatus, a learning method, and a program.

BACKGROUND ART

A technology for using a machine learning method to generate a mathematical model for converting an input acoustic time series into a predetermined format required by a downstream task is known. Here, the acoustic time series means a time series representing a sound such as an acoustic signal. The downstream task means processing in which feature data is used, and the contents of the processing may be any contents determined in advance. The feature data is information regarding a sound obtained on the basis of an acoustic time series, and is information regarding the sound expressed in a target format.

The downstream task may be, for example, processing of removing noise from a sound represented by input feature data, or processing of combining the sound represented by the input feature data with a sound represented by another acoustic time series. The downstream task may be, for example, processing of classifying the sound represented by the input feature data.

CITATION LIST

Non Patent Literature

Non Patent Literature 1: S. Hershey et al., "CNN architectures for large-scale audio classification", 2017 IEEE International Conference on Acoustics, Speech and Signal Processing (ICASSP), 2017, pp. 131-135, doi: 10.1109/ICASSP.2017.7952132.

Non Patent Literature 2: Kong et al., "PANNs: Large-Scale Pretrained Audio Neural Networks for Audio Pattern Recognition", in IEEE/ACM Transactions on Audio, Speech, and Language Processing, vol. 28, pp. 2880-2894, 2020, doi: 10.1109/TASLP.2020.3030497.

SUMMARY OF INVENTION

Technical Problem

However, in a case of executing a downstream task using a result of such a mathematical model, there has been cases where a result of the execution does not satisfy a predetermined criterion. For example, in a case of noise removal as described above, there has been cases where noise is not removed enough to satisfy a predetermined criterion. In addition, for example, in a case of sound classification as described above, there has been cases where the accuracy of the classification does not satisfy a predetermined criterion. That is, there has been cases where a probability that the classification returns an erroneous result is higher than the predetermined criterion.

In view of the above circumstances, an object of the present invention is to provide a technology for reducing a frequency at which an execution result of a downstream task does not satisfy a predetermined criterion.

Solution to Problem

An aspect of the present invention provides a learning device including: a neural network that converts an acoustic time series that is a time series representing a sound into feature data that is information regarding the sound obtained on the basis of the acoustic time series and is information expressed in a predetermined format required by a downstream task; and an update unit that updates the neural network on the basis of an execution result of the downstream task using the feature data, in which the neural network includes: a feature extraction unit that converts an input acoustic time series into an intermediate feature tensor that is a third-order tensor that indicates features of the acoustic time series and has time, frequency, and channel; and an intermediate network that executes non-equivalent second-order tensor processing of converting a representation of the intermediate feature tensor into a representation of a planar tensor that is a second-order tensor having time and direct product amounts that are amounts indicating a direct product of frequency and channel, and vectorization processing of acquiring, for each direct product amount of the planar tensor, a one-dimensional vector indicating a statistic in a time axis direction of each direct product amount as the feature data.

An aspect of the present invention provides a conversion device including: a conversion target acquisition unit that acquires an acoustic time series that is a time series representing a sound; and a conversion unit that converts, into feature data, the acoustic time series acquired by the conversion target acquisition unit using a trained neural network obtained by learning by a learning device, the learning device including: the neural network that converts an input acoustic time series into feature data that is information regarding the sound obtained on the basis of the acoustic time series and is information expressed in a predetermined format required by a downstream task; and an update unit that updates the neural network on the basis of an execution result of the downstream task using the feature data, in which the neural network includes: a feature extraction unit that converts an input acoustic time series into an intermediate feature tensor that is a third-order tensor that indicates features of the acoustic time series and has time, frequency, and channel; and an intermediate network that executes non-equivalent second-order tensor processing of converting a representation of the intermediate feature tensor into a representation of a planar tensor that is a second-order tensor having time and direct product amounts that are amounts indicating a direct product of frequency and channel, and vectorization processing of acquiring, for each direct product amount of the planar tensor, a one-dimensional vector indicating a statistic in a time axis direction of each direct product amount as the feature data.

An aspect of the present invention provides a learning method executed by a learning device including: a neural network that converts an acoustic time series that is a time series representing a sound into feature data that is information regarding the sound obtained on the basis of the acoustic time series and is information expressed in a predetermined format required by a downstream task; and an update unit that updates the neural network on the basis of an execution result of the downstream task using the feature data, in which the neural network includes: a feature extraction unit that converts an input acoustic time series into an intermediate feature tensor that is a third-order tensor that indicates features of the acoustic time series and has time, frequency, and channel; and an intermediate network that executes non-equivalent second-order tensor processing of converting a representation of the intermediate feature tensor into a representation of a planar tensor that is a second-order tensor having time and direct product amounts that are amounts indicating a direct product of frequency and channel, and vectorization processing of acquiring, for each direct product amount of the planar tensor, a one-dimensional vector indicating a statistic in a time axis direction of each direct product amount as the feature data, the learning method including: a feature extraction step of converting an input acoustic time series into an intermediate feature tensor that is a third-order tensor that indicates features of the acoustic time series and has time, frequency, and channel; a non-equivalent second-order tensor processing execution step of converting a representation of the intermediate feature tensor into a representation of a planar tensor that is a second-order tensor having time and direct product amounts that are amounts indicating a direct product of frequency and channel; and vectorization processing execution step of acquiring, for each direct product amount of the planar tensor, a one-dimensional vector indicating a statistic in a time axis direction of each direct product amount as the feature data.

One aspect of the present invention provides a program for causing a computer to function as the learning device described above.

One aspect of the present invention provides a program for causing a computer to function as the conversion device described above.

Advantageous Effects of Invention

According to the present invention, it is possible to reduce the frequency at which an execution result of a downstream task does not satisfy a predetermined criterion.

BRIEF DESCRIPTION OF DRAWINGS

FIG. 15 is a first diagram illustrating an example of an experimental result according to the modification.

DESCRIPTION OF EMBODIMENTS

Embodiment

Figure 1:
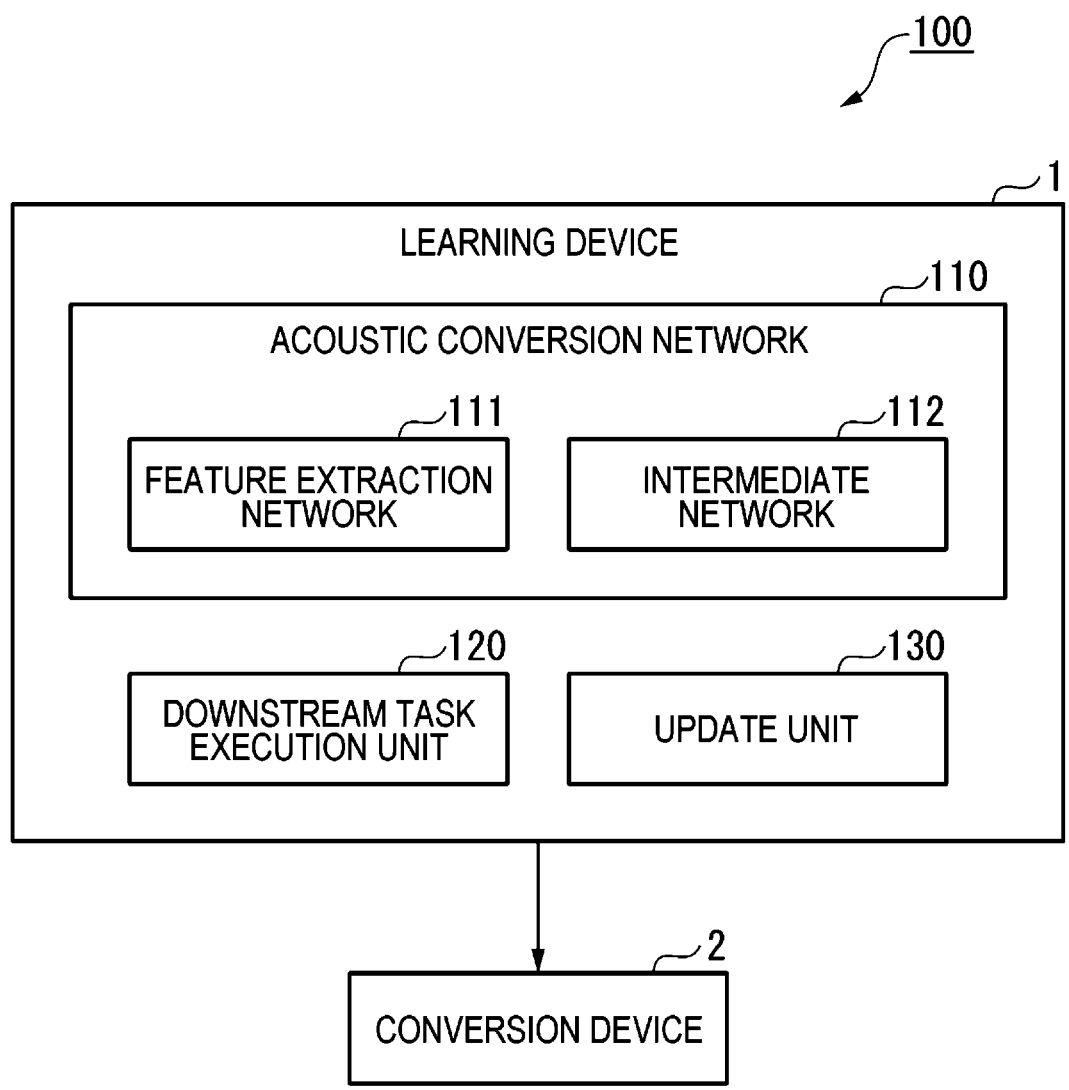
FIG. 1 is a diagram illustrating an example of a configuration of an acoustic time series conversion system according to an embodiment.

FIG. 1 is a diagram illustrating an example of a configuration of an acoustic time series conversion system 100 according to an embodiment. The acoustic time series conversion system 100 includes a learning device 1 and a conversion device 2. The learning device 1 performs learning to update the contents of processing of converting an input acoustic time series into data in a predetermined format (hereinafter referred to as a "target format") (the processing is hereinafter referred to as "acoustic conversion processing"). Hereinafter, information that is information regarding a sound obtained on the basis of an acoustic time series and is information regarding the sound expressed in the target format is referred to as feature data. The acoustic conversion processing is a type of learning model. The acoustic time series is a time series representing a sound such as an acoustic signal.

More specifically, the acoustic time series is information in which a sound is represented by a tensor. The acoustic time series may be, for example, a second-order tensor (that is, a matrix) indicating a frequency and an intensity of a frequency component of the frequency at each time, the tensor having an element, the value of which indicates the intensity of the frequency component. The acoustic time series may be, for example, a third-order tensor indicating a set of a channel, a frequency, and an intensity of a frequency component at each time, the tensor having an element, the value of which indicates the intensity of the frequency component.

The acoustic time series may be, for example, a first-order tensor (that is, a vector) indicating the intensity of a voice at each time. The intensity indicated by the value of the element of the tensor is the intensity of the frequency component in a case where the tensor is a second- or higher-order tensor.

The target format is specifically a predetermined format required by a downstream task. The downstream task means processing in which input feature data is used, and the contents of the processing may be any contents determined in advance.

The downstream task may be, for example, processing of removing noise from a sound represented by input feature data, or processing of combining the sound represented by the input feature data with a sound represented by another acoustic time series. The downstream task may be, for example, processing of classifying the sound represented by the input feature data. For example, in a case where the downstream task is a 10-class classification task, the target format is a format of 10 32-bit floating point numbers.

The learning device 1 includes an acoustic conversion network 110, a downstream task execution unit 120, and an update unit 130. The acoustic conversion network 110 is a neural network that includes a feature extraction network 111 and an intermediate network 112 and converts an input acoustic time series into feature data.

The neural network is a circuit such as an electronic circuit, an electric circuit, an optical circuit, or an integrated circuit, and is a circuit that represents a learning model. The neural network is updated by machine learning. More specifically, updating by machine learning means that a parameter of the neural network is suitably adjusted on the basis of the value of a loss function (that is, the loss). The parameter of the neural network is a parameter of the learning model to be represented. In addition, the parameter of the neural network is a parameter of the circuit constituting the neural network.

The feature extraction network 111 receives an input of an acoustic time series. The feature extraction network 111 converts the input acoustic time series into a third-order tensor indicating features of the input acoustic time series, the third-order tensor having time, frequency, and channel. Hereinafter, a third-order tensor indicating features of an input acoustic time series, the third-order tensor having time, frequency, and channel, is referred to as an intermediate feature tensor.

Figure 2:
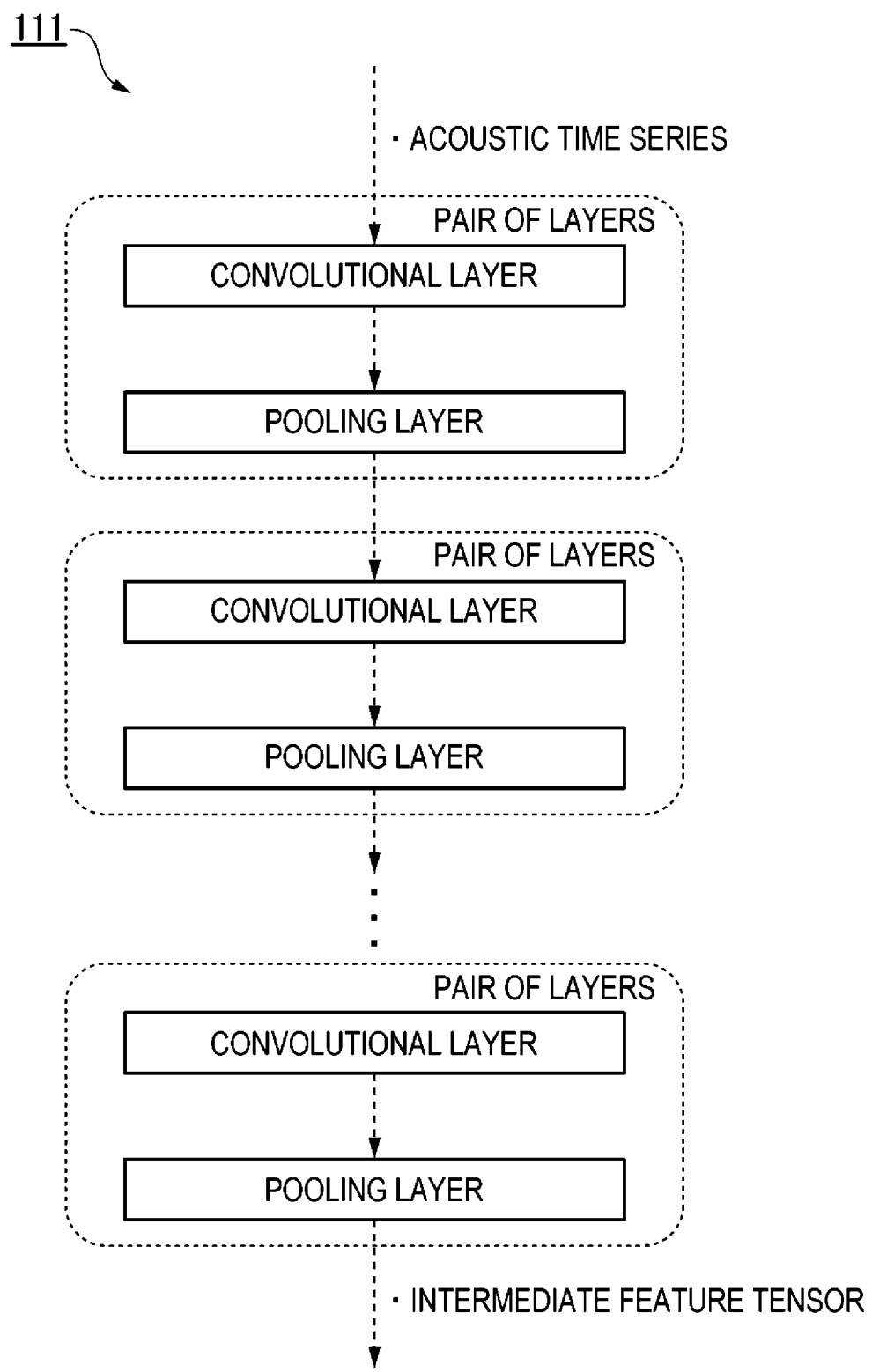
FIG. 2 is an explanatory diagram illustrating an example of a configuration of a feature extraction network according to the embodiment.

FIG. 2 is an explanatory diagram illustrating an example of a configuration of the feature extraction network 111 according to the embodiment. The feature extraction network 111 is a neural network including one or more pairs of a convolutional layer and a pooling layer (hereinafter referred to as "pairs of layers"). In each pair of layers, the convolutional layer is located so as to precede the pooling layer. That is, in each pair of layers, the pooling layer is located so as to be subsequent to the convolutional layer. Therefore, in each pair of layers, an output from the convolutional layer is input to the pooling layer.

In a case where the feature extraction network 111 includes a plurality of pairs of layers, the pairs of layers are arranged one-dimensionally. Being arranged one-dimensionally means that the arrangement of the pairs of layers satisfies a first arrangement condition, a second arrangement condition, and a third arrangement condition. The first arrangement condition is that each pair of layers is connected to one or more and two or less other pairs of layers, and a pair of layers connected to two pairs of layers has an input side connected to one of the other pairs of layers, and an output side connected to one of the other pairs of layers, the one being different from the pair of layers connected to the input side. The second arrangement condition is that the number of pairs of layers connected to one of the other pairs of layers is two. The third arrangement condition is that two pairs of layers are connected to each other such that an output from the pooling layer of the preceding pair of layers is input to the convolutional layer of the subsequent pair of layers.

An intermediate feature tensor is output from the last pair of layers.

The description returns to FIG. 1. The intermediate network 112 receives an input of an intermediate feature tensor. The intermediate network 112 uses non-equivalent second-order tensor processing and vectorization processing to convert a representation of the input intermediate feature tensor from a third-order tensor into a first-order tensor. The first-order tensor is a one-dimensional vector.

<Non-Equivalent Second-Order Tensor Processing>

The non-equivalent second-order tensor processing is processing of converting a representation of an intermediate feature tensor represented by a third-order tensor having time, frequency, and channel into a representation of a second-order tensor having time and direct product amount. The direct product amount is amounts indicating a direct product of frequency and channel. That is, the direct product amount is an identifier for identifying each amount of a direct product of frequency and channel. A second-order tensor having time and direct product amount is hereinafter referred to as a planar tensor.

For simplicity of description, some terms and expressions are defined below. A third-order tensor having time, frequency, and channel is hereinafter referred to as a third-order acoustic tensor. The intermediate feature tensor is an example of the third-order acoustic tensor. Hereinafter, the number of time elements in a tensor is represented by a, the number of frequency elements is represented by b, and the number of channel elements is represented by c. Hereinafter, the size of a third-order tensor in which the number of time elements is a, the number of frequency elements is b, and the number of channel elements is c is represented by (a, b, c). Hereinafter, a third-order acoustic tensor of a size (a, b, c) is represented by a third-order acoustic tensor (a, b, c).

A second-order tensor having time and direct product amount is hereinafter referred to as a second-order acoustic tensor. A planar tensor is an example of the second-order acoustic tensor. Hereinafter, the number of direct product amount elements in a tensor is represented by d. Therefore, the size of a second-order acoustic tensor is represented by (a, d). Since the direct product amount is a direct product of frequency and channel, d=b×c holds. The symbol × simply means multiplication, not direct product. Hereinafter, a second-order acoustic tensor of a size (a, d) is represented by a second-order acoustic tensor (a, d).

Hereinafter, a first-order tensor of a size e is referred to as a first-order acoustic tensor, and the size is represented by (e). That is, a first-order acoustic tensor of a size e is represented by a first-order acoustic tensor (e).

When such an expression is used, the non-equivalent second-order tensor processing is expressed as processing of converting an intermediate feature tensor (a, b, c) into a planar tensor (a, d).

<Vectorization Processing>

The vectorization processing is processing of acquiring, for each direct product amount of the planar tensor, a statistical vector, which is a one-dimensional vector indicating a statistic in a time axis direction of each direct product amount.

The vectorization processing is, for example, processing of acquiring a statistical vector by executing time axis direction average pooling.

<Time Axis Direction Average Pooling>

The time axis direction average pooling is processing of acquiring an average vector on the basis of a planar tensor. The average vector is a one-dimensional vector indicating, for each direct product amount of the planar tensor, an average value in the time axis direction of each direct product amount. Therefore, in a case where the size of the direct product amount of the planar tensor is d, the number of elements of the average vector is d. As described above, the time axis direction average pooling is processing of converting a planar tensor (a, d) into an average vector (d). The statistical vector is, for example, an average vector obtained in this manner.

The vectorization processing is, for example, processing of acquiring a statistical vector by executing time axis direction max pooling.

<Time Axis Direction Max Pooling>

The time axis direction max pooling is processing of acquiring a maximum vector on the basis of a planar tensor. The maximum vector is a one-dimensional vector indicating, for each direct product amount of the planar tensor, a maximum value in the time axis direction of each direct product amount. Therefore, in a case where the size of the direct product amount of the planar tensor is d, the number of elements of the maximum vector is d. As described above, the time axis direction max pooling is processing of converting a planar tensor (a, d) into a maximum vector (d). The statistical vector is, for example, a maximum vector obtained in this manner.

The vectorization processing is processing of acquiring a statistical vector by executing, for example, the time axis direction average pooling, the time axis direction max pooling, and vector sum acquisition processing. The vector sum acquisition processing is processing of acquiring a one-dimensional vector represented by a vector sum of an average vector and a maximum vector.

Since an average vector and a maximum vector obtained on the basis of the same planar tensor are the same in size, a vector sum can be defined between the average vector and the maximum vector. Thus, a vector sum of an average vector and a maximum vector can be acquired by the vector sum acquisition processing. The size of a one-dimensional vector represented by a vector sum of an average vector and a maximum vector is d, which is the same as the size of the average vector or the maximum vector.

As described above, a statistic in the time axis direction of each direct product amount in the vectorization processing is, for example, either the average value or the maximum value. As described above, the statistical vector may be a one-dimensional vector of a vector sum of a one-dimensional vector indicating, for each direct product amount of the planar tensor, an average value in the time axis direction of each direct product amount and a one-dimensional vector indicating, for each direct product amount of the planar tensor, a maximum value in the time axis direction of each direct product amount.

The statistical vector thus obtained is feature data. Therefore, the predetermined format required by the downstream task is specifically a format that satisfies a condition of being a one-dimensional vector. Thus, the vectorization processing is processing of acquiring, for each direct product amount of the planar tensor, a one-dimensional vector indicating a statistic in the time axis direction of each direct product amount as feature data. In addition, since the statistical vector is feature data, the statistical vector is input as feature data to the downstream task execution unit 120. That is, the statistical vector is input to the downstream task.

The acoustic conversion network 110 including the feature extraction network 111 and the intermediate network 112 as described above is updated by learning. The acoustic conversion network 110 is updated by learning such that conversion from an acoustic time series to feature data is performed in the acoustic conversion network 110 so as to reduce the frequency at which an execution result of a downstream task does not satisfy a predetermined criterion.

Processing of causing the acoustic conversion network 110 to perform conversion from an acoustic time series to feature data is acoustic conversion processing.

The update performed such that conversion from an acoustic time series to feature data is performed in the acoustic conversion network 110 so as to reduce the frequency at which an execution result of a downstream task does not satisfy a predetermined criterion is, for example, an update to reduce the value of an acoustic loss function.

The acoustic loss function is a loss function in which the value of the function is a value indicating a difference between an execution result of the downstream task and a result determined in advance as a result satisfying a predetermined criterion. The value indicating the difference between the execution result of the downstream task and the result determined in advance as the result satisfying the predetermined criterion is, for example, the difference between the execution result of the downstream task and the result determined in advance as the result satisfying the predetermined criterion.

The downstream task execution unit 120 uses input feature data to execute a predetermined downstream task. The update unit 130 updates the acoustic conversion network 110 on the basis of the execution result of the downstream task by the downstream task execution unit 120. In the update, for example, an update to reduce the value of the acoustic loss function is performed. The learning is executed until a predetermined end condition is satisfied. The predetermined end condition (hereinafter referred to as a "learning end condition") is, for example, a condition that a predetermined number of updates have been performed. The update unit 130 also executes processing of determining whether the learning end condition has been satisfied.

As described above, the learning device 1 converts an acoustic time series into a statistical vector, and updates the acoustic conversion network 110 on the basis of the execution result of the downstream task using the statistical vector. Therefore, learning data in learning executed by the learning device 1 includes an acoustic time series.

The conversion device 2 uses the trained acoustic conversion network 110 to convert a voice time series, which is a conversion target, into feature data. The trained acoustic conversion network 110 is the acoustic conversion network 110 at the time when the learning end condition is satisfied. The conversion device 2 is provided with the trained acoustic conversion network 110 retrofitted from the learning device 1.

In a case where the conversion device 2 is provided with the acoustic conversion network 110 in advance, the conversion device 2 may acquire network parameter information from the learning device 1 and obtain the trained acoustic conversion network 110 on the basis of the acquired network parameter information. Specifically, the conversion device 2 may obtain the trained acoustic conversion network 110 by converting the acoustic conversion network 110 provided in advance into the trained acoustic conversion network 110 on the basis of the acquired network parameter information. The network parameter information is information indicating the value of each parameter of the trained acoustic conversion network 110.

In this manner, the conversion device 2 is provided with the same neural network as the trained acoustic conversion network 110 included in the learning device 1.

Figure 3:
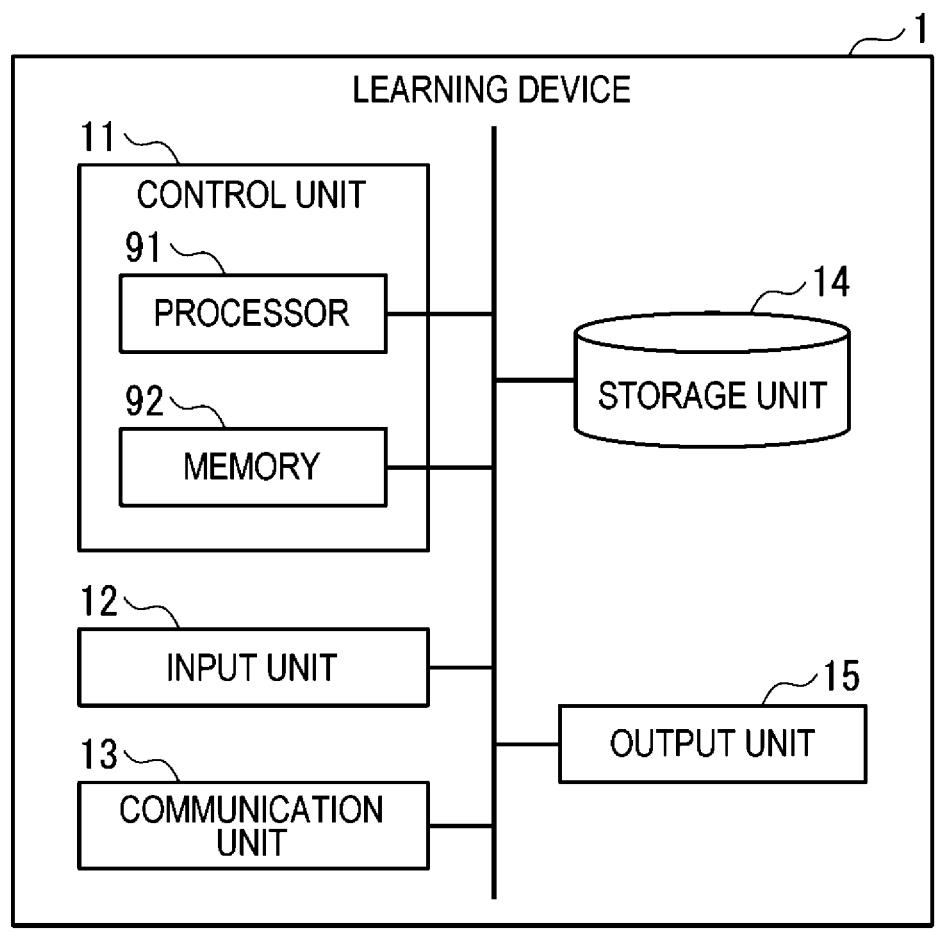
FIG. 3 is a diagram illustrating an example of a hardware configuration of a learning device according to the embodiment.

FIG. 3 is a diagram illustrating an example of a hardware configuration of the learning device 1 according to the embodiment. The learning device 1 includes a control unit 11 including a processor 91 such as a central processing unit (CPU) and a memory 92, which are connected by a bus, and executes a program. The learning device 1 functions as a device including the control unit 11, an input unit 12, a communication unit 13, a storage unit 14, and an output unit 15 by executing a program.

More specifically, the processor 91 reads a program stored in the storage unit 14, and stores the read program in the memory 92. The processor 91 executes the program stored in the memory 92 to cause the learning device 1 to function as a device including the control unit 11, the input unit 12, the communication unit 13, the storage unit 14, and the output unit 15.

The control unit 11 controls operations of various functional units included in the learning device 1. The control unit 11 includes the acoustic conversion network 110, the downstream task execution unit 120, and the update unit 130. The control unit 11 controls, for example, the operation of the output unit 15. The control unit 11 records, in the storage unit 14, various types of information generated by the operations of the acoustic conversion network 110, the downstream task execution unit 120, and the update unit 130, for example.

The input unit 12 includes an input device such as a mouse, a keyboard, or a touchscreen. The input unit 12 may be configured as an interface that connects these input devices to the learning device 1. The input unit 12 receives inputs of various types of information to the learning device 1.

The communication unit 13 includes a communication interface for connecting the learning device 1 to an external device. The communication unit 13 communicates with the external device in a wired or wireless manner. The external device is, for example, a device from which an acoustic time series is transmitted. The external device is, for example, the conversion device 2.

The storage unit 14 is configured using a computer-readable storage medium device such as a magnetic hard disk device or a semiconductor storage device. The storage unit 14 stores various types of information regarding the learning device 1. The storage unit 14 stores, for example, information input via the input unit 12 or the communication unit 13. The storage unit 14 stores, for example, various types of information generated by the operations of the acoustic conversion network 110, the downstream task execution unit 120, and the update unit 130.

The output unit 15 outputs various types of information. The output unit 15 includes, for example, a display device such as a cathode ray tube (CRT) display, a liquid crystal display, or an organic electro-luminescence (EL) display. The output unit 15 may be configured as an interface that connects these display devices to the learning device 1. The output unit 15 outputs, for example, information input to the input unit 12.

Figure 4:
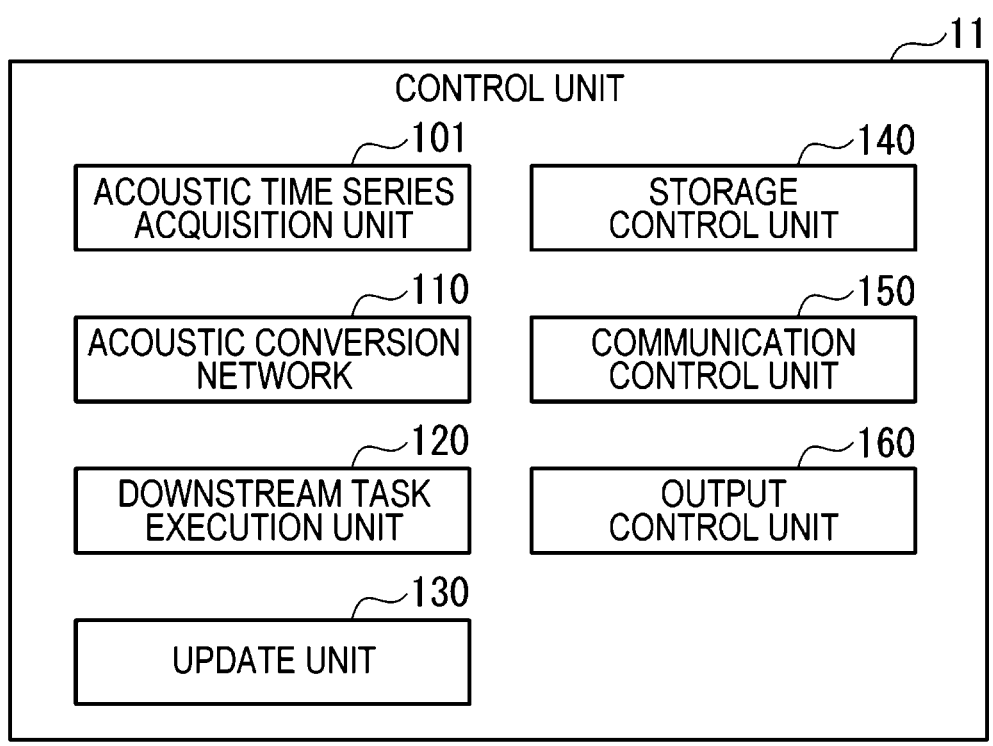
FIG. 4 is a diagram illustrating an example of a configuration of a control unit included in the learning device according to the embodiment.

FIG. 4 is a diagram illustrating an example of a configuration of the control unit 11 according to the embodiment. The control unit 11 includes an acoustic time series acquisition unit 101, the acoustic conversion network 110, the downstream task execution unit 120, the update unit 130, a storage control unit 140, a communication control unit 150, and an output control unit 160. The acoustic time series acquisition unit 101 acquires an acoustic time series input to the communication unit 13. The storage control unit 140 records various types of information in the storage unit 14. The communication control unit 150 controls the operation of the communication unit 13. The output control unit 160 controls the operation of the output unit 15.

Figure 5:
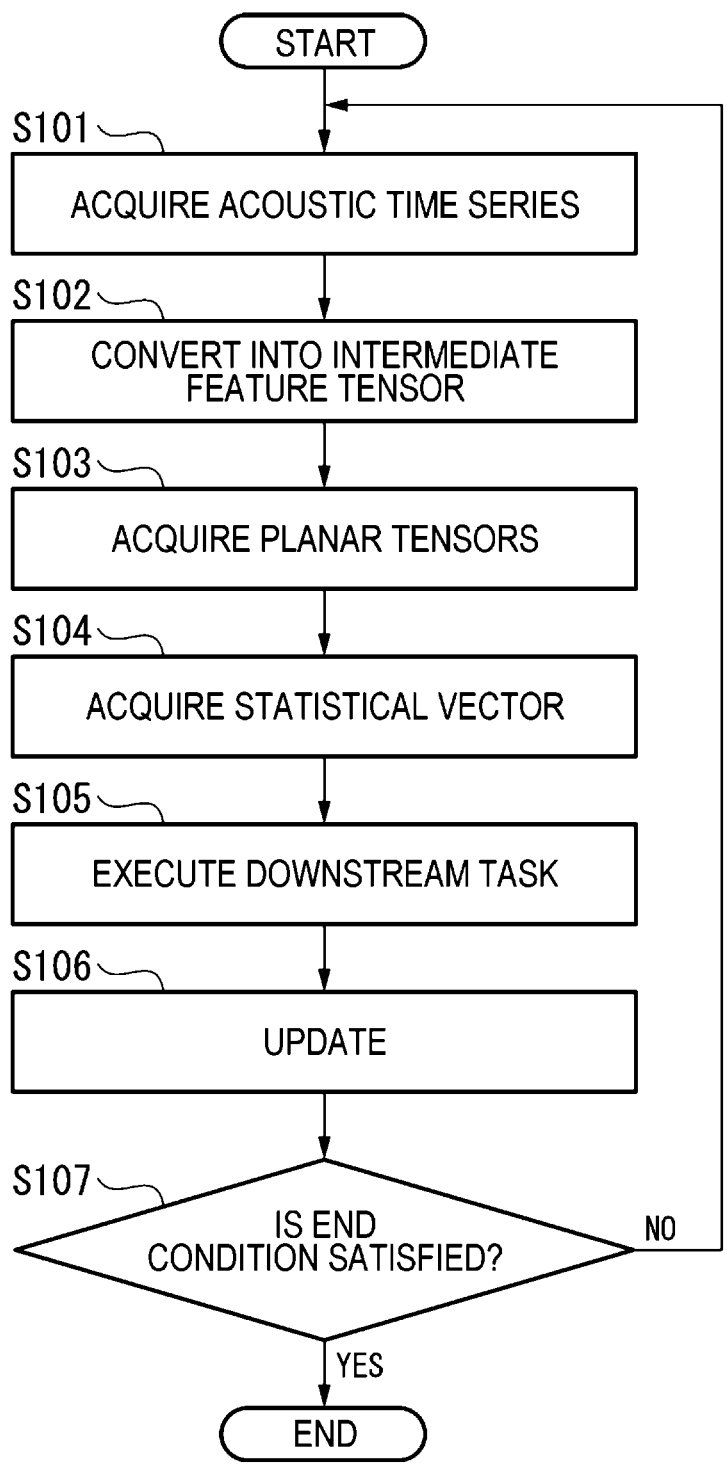
FIG. 5 is a flowchart illustrating an example of a flow of processing executed by the learning device according to the embodiment.

FIG. 5 is a flowchart illustrating an example of a flow of processing executed by the learning device 1 according to the embodiment. The acoustic time series acquisition unit 101 acquires an acoustic time series (step S101). Next, the feature extraction network 111 converts the acoustic time series into an intermediate feature tensor (step S102). Next, the intermediate network 112 acquires a planar tensor on the basis of the intermediate feature tensor by executing the non-equivalent second-order tensor processing (step S103).

Next, the intermediate network 112 acquires a statistical vector on the basis of the planar tensor by executing the vectorization processing (step S104). The acquired statistical vector is feature data. Next, the downstream task execution unit 120 executes a predetermined downstream task by using the feature data (step S105). Next, on the basis of a result of the execution of the downstream task in step S105, the update unit 130 updates the acoustic conversion network 110 (step S106).

Next, the update unit 130 determines whether a learning end condition is satisfied (step S107). In a case where the learning end condition is not satisfied (step S107: NO), the processing returns to step S101. In a case where the learning end condition is satisfied (step S107: YES), the processing ends. The acoustic conversion network 110 at the end of the processing is the trained acoustic conversion network 110.

Figure 6:
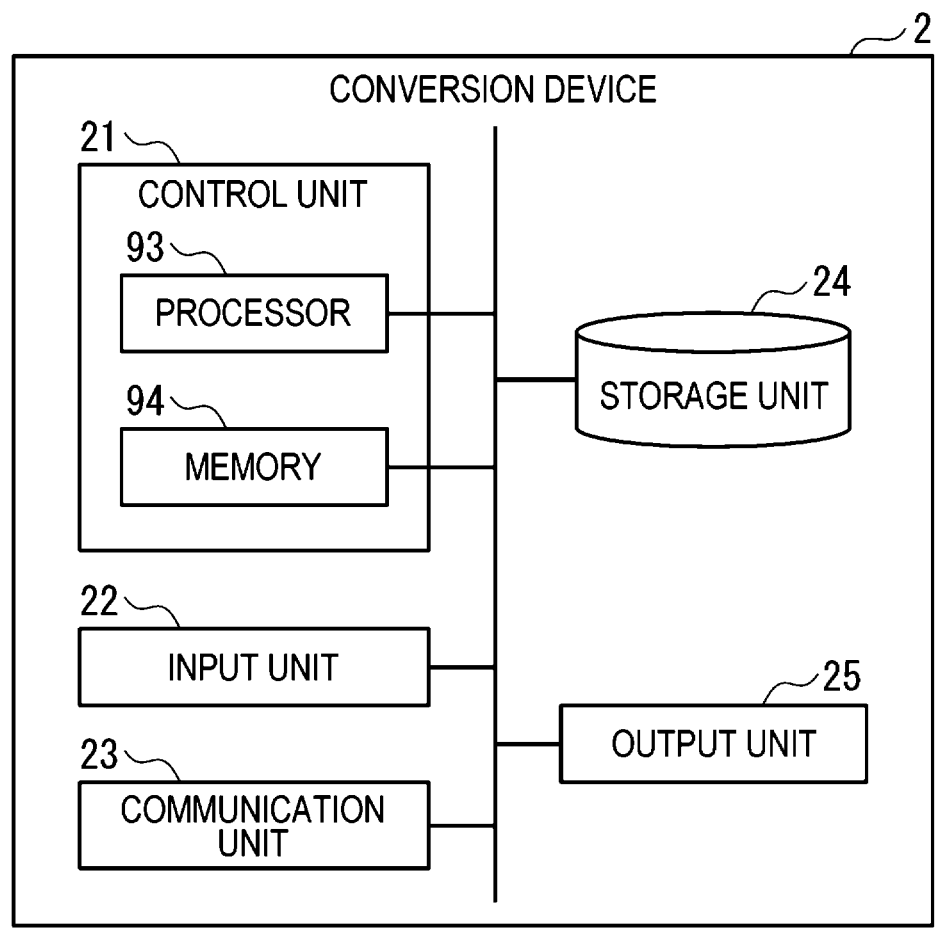
FIG. 6 is a diagram illustrating an example of a hardware configuration of a conversion device according to the embodiment.

FIG. 6 is a diagram illustrating an example of a hardware configuration of the conversion device 2 according to the embodiment. The conversion device 2 includes a control unit 21 including a processor 93 such as a CPU and a memory 94 connected via a bus, and executes a program. The conversion device 2 executes the program to function as a device including the control unit 21, an input unit 22, a communication unit 23, a storage unit 24, and an output unit 25.

More specifically, the processor 93 reads the program stored in the storage unit 24, and stores the read program in the memory 94. The processor 93 executes the program stored in the memory 94 to cause the conversion device 2 to function as a device including the control unit 21, the input unit 22, the communication unit 23, the storage unit 24, and the output unit 25.

The control unit 21 controls operations of various functional units included in the conversion device 2. The control unit 21 includes the trained acoustic conversion network 110. The control unit 21 executes the trained acoustic conversion network 110. The control unit 21 controls, for example, the operation of the output unit 25. The control unit 21 records, for example, various types of information generated by execution of the trained acoustic conversion network 110 in the storage unit 24.

The input unit 22 includes an input device such as a mouse, a keyboard, or a touchscreen. The input unit 22 may be configured as an interface that connects these input devices to the conversion device 2. The input unit 22 receives inputs of various types of information to the conversion device 2.

The communication unit 23 includes a communication interface for connecting the conversion device 2 to an external device. The communication unit 23 communicates with the external device in a wired or wireless manner. The external device is, for example, a device from which an acoustic time series to be converted is transmitted. The external device is, for example, the learning device 1.

The storage unit 24 is configured using a computer-readable storage medium device such as a magnetic hard disk device or a semiconductor storage device. The storage unit 24 stores various types of information regarding the conversion device 2. The storage unit 24 stores, for example, information input via the input unit 22 or the communication unit 23. The storage unit 24 stores, for example, a result of execution of the trained acoustic conversion network 110.

The output unit 25 outputs various types of information. The output unit 25 includes, for example, a display device such as a CRT display, a liquid crystal display, or an organic EL display. The output unit 25 may be configured as an interface that connects these display devices to the conversion device 2. The output unit 25 outputs, for example, information input to the input unit 22. The output unit 25 may display, for example, an execution result of the trained acoustic conversion network 110.

Figure 7:
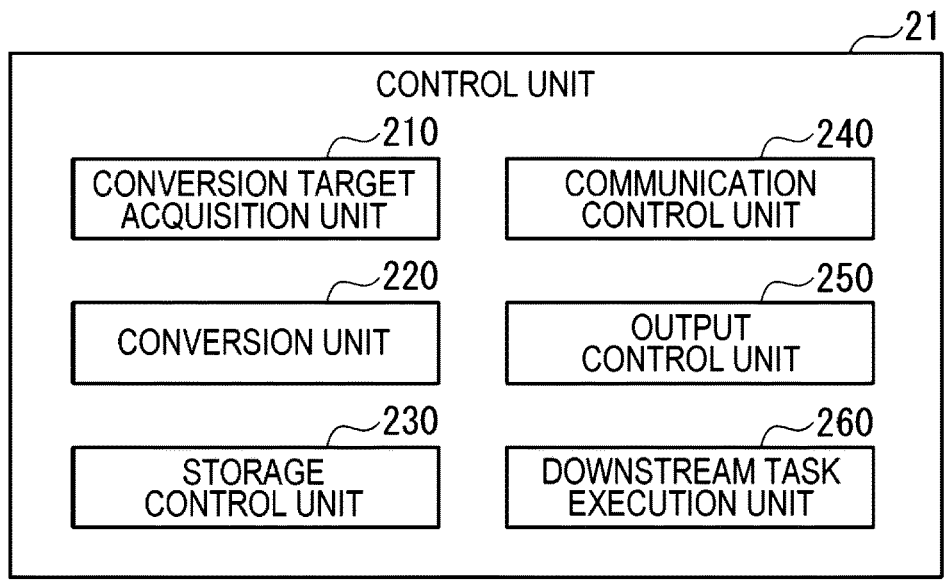
FIG. 7 is a diagram illustrating an example of a configuration of a control unit according to the embodiment.

FIG. 7 is a diagram illustrating an example of a configuration of the control unit 21 according to the embodiment. The control unit 21 includes a conversion target acquisition unit 210, a conversion unit 220, a storage control unit 230, a communication control unit 240, an output control unit 250, and a downstream task execution unit 260. The conversion target acquisition unit 210 acquires an acoustic time series input to the communication unit 23.

Specifically, the conversion unit 220 is the trained acoustic conversion network 110. The conversion unit 220 converts the acoustic time series acquired by the conversion target acquisition unit 210 into feature data by the trained acoustic conversion network 110.

The storage control unit 230 records various types of information in the storage unit 24. The communication control unit 240 controls the operation of the communication unit 23. The output control unit 250 controls the operation of the output unit 25. The downstream task execution unit 260 executes the same predetermined downstream task as the downstream task executed by the learning device 1.

Figure 8:
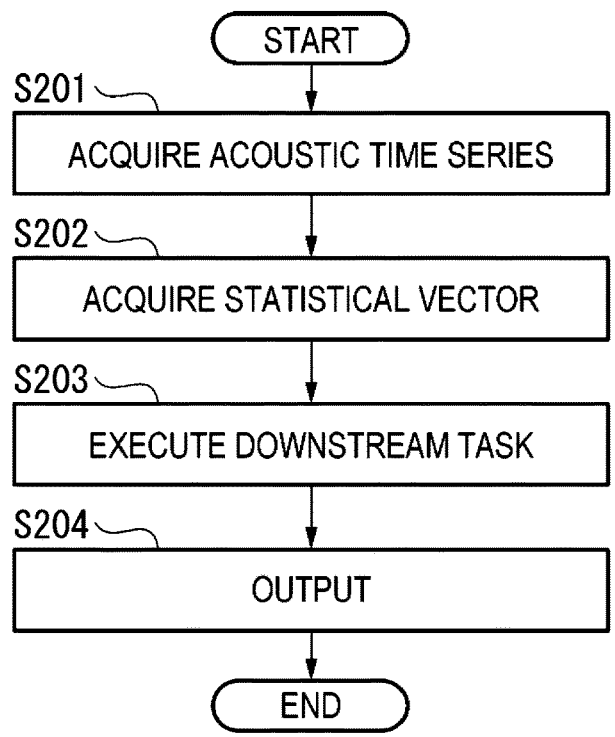
FIG. 8 is a flowchart illustrating an example of a flow of processing executed by the conversion device according to the embodiment.

FIG. 8 is a flowchart illustrating an example of a flow of processing executed by the conversion device 2 according to the embodiment. The conversion target acquisition unit 210 acquires an acoustic time series input to the communication unit 23 (step S201). Next, the conversion unit 220 acquires a statistical vector by the trained acoustic conversion network 110 on the basis of the acoustic time series acquired in step S201 (step S202). Next, the downstream task execution unit 260 executes a predetermined downstream task by using the statistical vector obtained in step S202 as feature data (step S203). After step S203, the output control unit 250 controls the operation of the output unit 25 to cause the output unit 25 to output the execution result of the downstream task (step S204).

<Experimental Results>

Figures 9, 10:
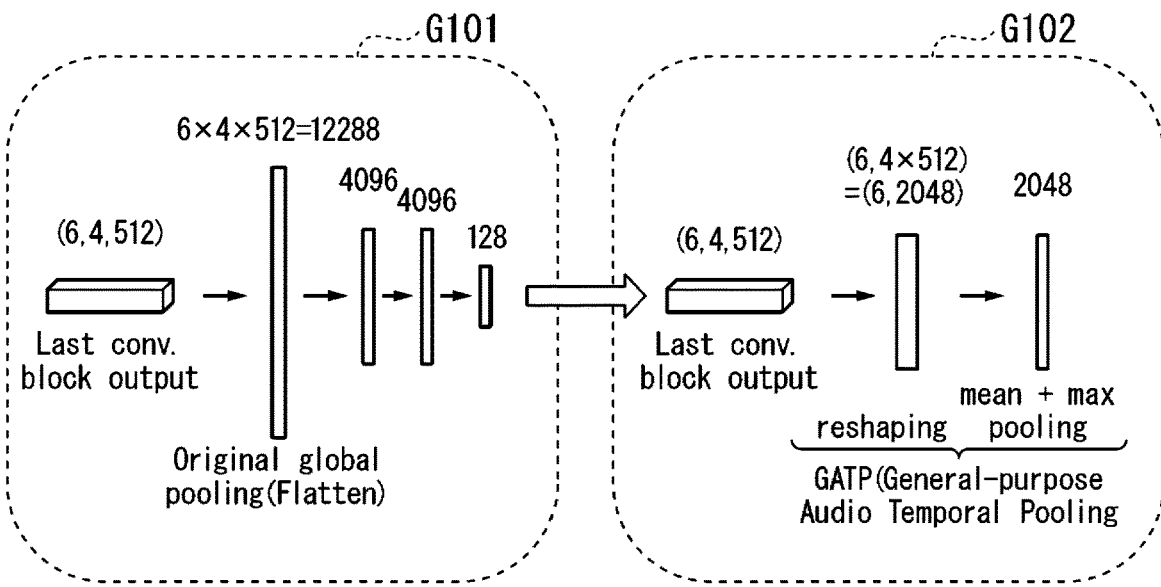
FIG. 9 is a first explanatory diagram illustrating an experimental result according to the embodiment.
FIG. 10 is a second explanatory diagram illustrating an experimental result according to the embodiment.

Results of a plurality of experiments will be described with reference to FIGS. 9 to 11. FIG. 9 is a first explanatory diagram illustrating experimental results according to the embodiment. FIG. 10 is a second explanatory diagram illustrating experimental results according to the embodiment. More specifically, FIG. 10 is an explanatory diagram illustrating VGGish, which is an encoder CNN that performs learning by classification of sound by diverting an image classification model VGG to an acoustic signal, and processing in which flattening processing of VGGish is replaced with the non-equivalent second-order tensor processing and the vectorization processing. In the vectorization processing performed in the experiments, specifically, a one-dimensional vector of a vector sum of an average vector and a maximum vector was acquired.

Figures 11, 12:
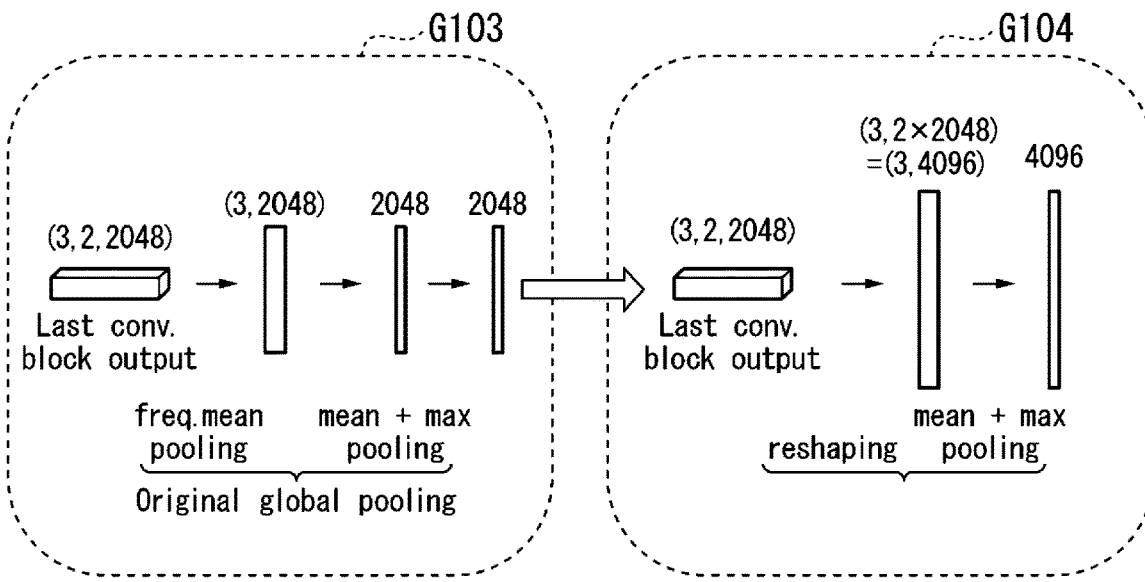
FIG. 11 is a third explanatory diagram illustrating an experimental result according to the embodiment.
FIG. 12 is a diagram illustrating an example of a result of an experiment according to a modification.

FIG. 11 is a third explanatory diagram illustrating an experimental result according to the embodiment. More specifically, FIG. 11 is an explanatory diagram illustrating CNN14, which is a learning model that has been proposed for acoustic signals and performs supervised learning with sound classification as in VGGish, and processing in which processing of CNN14 is replaced with the non-equivalent second-order tensor processing and the vectorization processing. In the vectorization processing performed in the experiments, specifically, a one-dimensional vector of a vector sum of an average vector and a maximum vector was acquired.

"US8K" illustrated in FIG. 9 indicates UrbanSound8k, which is a task of classifying environmental sounds such as a horn and a dog barking. "SPCV2" indicates Speech commands V2, which is a voice command classification task. "VoxCeleb1" indicates VoxCeleb1, which is a speaker classification task. "NSynth" indicates NSynth, which is a musical instrument sound classification task. "Surge" indicates Pitch Audio Dataset (Surge synthesizer), which is a musical scale classification task.

A result E101 in FIG. 9 is an example of a processing result of existing VGGish. Specifically, in the performed processing, a spectrogram with 96 frames in time, 64 frequency bins in frequency, and 1 channel in channel was input, and flattening in a channel direction was performed every time the input spectrogram passed through a convolutional layer. The size of data changed as follows.

(96, 64, 1) changed to (96, 64, 64), then to (48, 32, 128), then to (24, 16, 256), and then to (12, 6, 512). The change continued in a similar manner until a third-order acoustic tensor (6, 4, 512) was obtained. In the processing, the flattening processing was then performed on the third-order acoustic tensor (6, 4, 512) to generate a first-order acoustic tensor (6×4×512). An image G101 in FIG. 10 illustrates this flattening processing.

A result E102 in FIG. 9 is an example of a result obtained by replacing the flattening processing of VGGish with the non-equivalent second-order tensor processing and the vectorization processing. An image G102 in FIG. 10 illustrates processing in which the flattening processing of VGGish is replaced with the non-equivalent second-order tensor processing and the vectorization processing.

The results E101 and E102 in FIG. 9 show that the result E102 is higher in frequency at which an execution result of a downstream task satisfies a predetermined criterion.

A result E103 in FIG. 9 is an example of a result of processing of existing CNN14. In the experiment, the final convolutional layer output of CNN14 was (3, 2, 2048). In the experiment, global pooling was then performed in CNN14.

Specifically, first, two frequency bins were averaged and converted into a (3, 2048) matrix. Thereafter, an average value and a maximum value were calculated in a time direction, and the feature was output as a 2048-dimensional vector. That is, in the experiment, a feature tensor (3, 2, 2048) was converted into a second-order acoustic tensor (3, 2048) in CNN14. An image G103 in FIG. 11 illustrates this global pooling processing.

A result E104 in FIG. 9 is an example of a result obtained by replacing the processing of existing CNN14 with the non-equivalent second-order tensor processing and the vectorization processing. An image G104 in FIG. 11 illustrates processing in which the processing of CNN14 is replaced with the non-equivalent second-order tensor processing and the vectorization processing. Specifically, in the performed processing, frequency and channel components of a feature tensor (3, 2, 2048) was expanded and transformed into a matrix of (3, 2×2048=4096) by the non-equivalent second-order tensor processing, then a one-dimensional vector of a vector sum of an average vector and a maximum vector was calculated by the vectorization processing, and thus 4096-dimensional feature data was output.

The result E103 shows that, in existing CNN14, a higher frequency range and a lower frequency range of the frequency component are simply averaged and the information is lost, and thus performance is not utilized particularly in a task in which pitch determination is important. The result E103 and the result E104 show that the result E104 is higher in frequency at which an execution result of a downstream task satisfies a predetermined criterion.

The learning device 1 configured as described above executes the non-equivalent second-order tensor processing and the vectorization processing. Thus, the learning device 1 obtains a feature in which the frequency and channel components are not mixed, while deleting the time components by calculating statistics of the frequency and the channel on the time axis, instead of treating the frequency, the channel, and the time without distinction. Therefore, the reduction in the amount of information is small as compared with treating the frequency, the channel, and the time without distinction. Thus, the learning device 1 can reduce the frequency at which an execution result of a downstream task does not satisfy a predetermined criterion.

Furthermore, the conversion device 2 configured as described above performs conversion using the trained feature extraction network 111 obtained by learning by the learning device 1. Thus, the conversion device 2 can reduce the frequency at which an execution result of a downstream task does not satisfy a predetermined criterion.

(Modification)

A non-equivalent second-order tensor processing execution unit 121 may convert an obtained planar tensor into a planar tensor at least partially changed by a mathematical model of machine learning. That is, the non-equivalent second-order tensor processing execution unit 121 may update an obtained planar tensor with a mathematical model of machine learning to acquire a new planar tensor. In such a case, the mathematical model of machine learning for updating the planar tensor is updated when the acoustic conversion network 110 is updated by learning.

The feature extraction network 111 is an example of a feature extraction unit. Processing of converting an input acoustic time series into an intermediate feature tensor is not necessarily executed by a neural network as illustrated in FIG. 2. Here, an example of processing executed by the feature extraction network 111 and results of experiments will be described with reference to FIG. 12.

FIG. 12 is a diagram illustrating an example of results of experiments according to the modification. The processing of converting an input acoustic time series into an intermediate feature tensor may be, for example, processing of converting an input acoustic time series into a linear scale spectrogram. That is, the feature extraction network 111 may execute, instead of the processing in FIG. 2, the processing of converting an input acoustic time series into a linear scale spectrogram. In this case, the intermediate feature tensor is a linear scale spectrogram.

A result E201 in FIG. 12 is an example of a result of an experiment using the processing of converting an input acoustic time series into a linear scale spectrogram. The result E201 shows that, also by the processing of converting an input acoustic time series into a linear scale spectrogram, sufficient performance can be obtained in a downstream task in which musical pitches are important. In the vectorization processing performed in the experiments, specifically, a one-dimensional vector of a vector sum of an average vector and a maximum vector was acquired.

In a case where an acoustic time series input to the feature extraction network 111 is a spectrogram, the number of pairs of layers included in the feature extraction network 111 may be one or two.

Results E202 and E203 in FIG. 12 are examples of results of experiments in a case where the number of pairs of layers included in the feature extraction network 111 is one or two. The results E202 and E203 show that high performance results are obtained with 768 or 2544 parameters. The parameters are numbers of weights of the neural network. For example, in a case of convolution with a 3×3 Conv layer and 64-channel output, the number of parameters is 640, which is obtained by multiplying 10 by 64, 10 being the sum of 3×3=9 weights and 1 bias. Note that the numerical value 768 described above means that the total number is 768, since 128 parameters are consumed in another layer BatchNorm having parameters included in the feature extraction network 111 in which the number of pairs of layers is one. In the vectorization processing performed in the experiments, specifically, a one-dimensional vector of a vector sum of an average vector and a maximum vector was acquired.

The non-equivalent second-order tensor processing and the vectorization processing may be applied to self-supervised learning such as Bootstrap Your Own Latent (BYOL) for Audio.

The weight of the acoustic conversion network 110 before the start of learning by the learning device 1 may be the weight of the trained acoustic conversion network 110 trained in advance using a downstream task different from the downstream task executed by the learning device 1. That is, the learning of the acoustic conversion network 110 by the learning device 1 may be transfer learning.

As described above, the feature extraction network 111 in the learning device 1 of the embodiment is a neural network including one or more pairs of layers. Furthermore, in the feature extraction network 111 in the learning device 1 of the embodiment, the intermediate feature tensor is one output from the last pair of layers. Then, a planar tensor is acquired on the basis of the one intermediate feature tensor that has been obtained.

However, in a case where the feature extraction network 111 is a neural network including a plurality of pairs of layers, the intermediate feature tensor does not necessarily need to be one output from the last pair of layers.

For example, the feature extraction network 111 may output, as one intermediate feature tensor, an output from each one of a plurality of pairs of layers different from each other. That is, the feature extraction unit may convert an input acoustic time series into a plurality of intermediate feature tensors.

Therefore, hereinafter, the feature extraction network 111 that outputs, as one intermediate feature tensor, an output from each one of a plurality of pairs of layers different from each other is defined as a feature extraction network 111a, and will be described with reference to FIG. 13.

Figure 13:
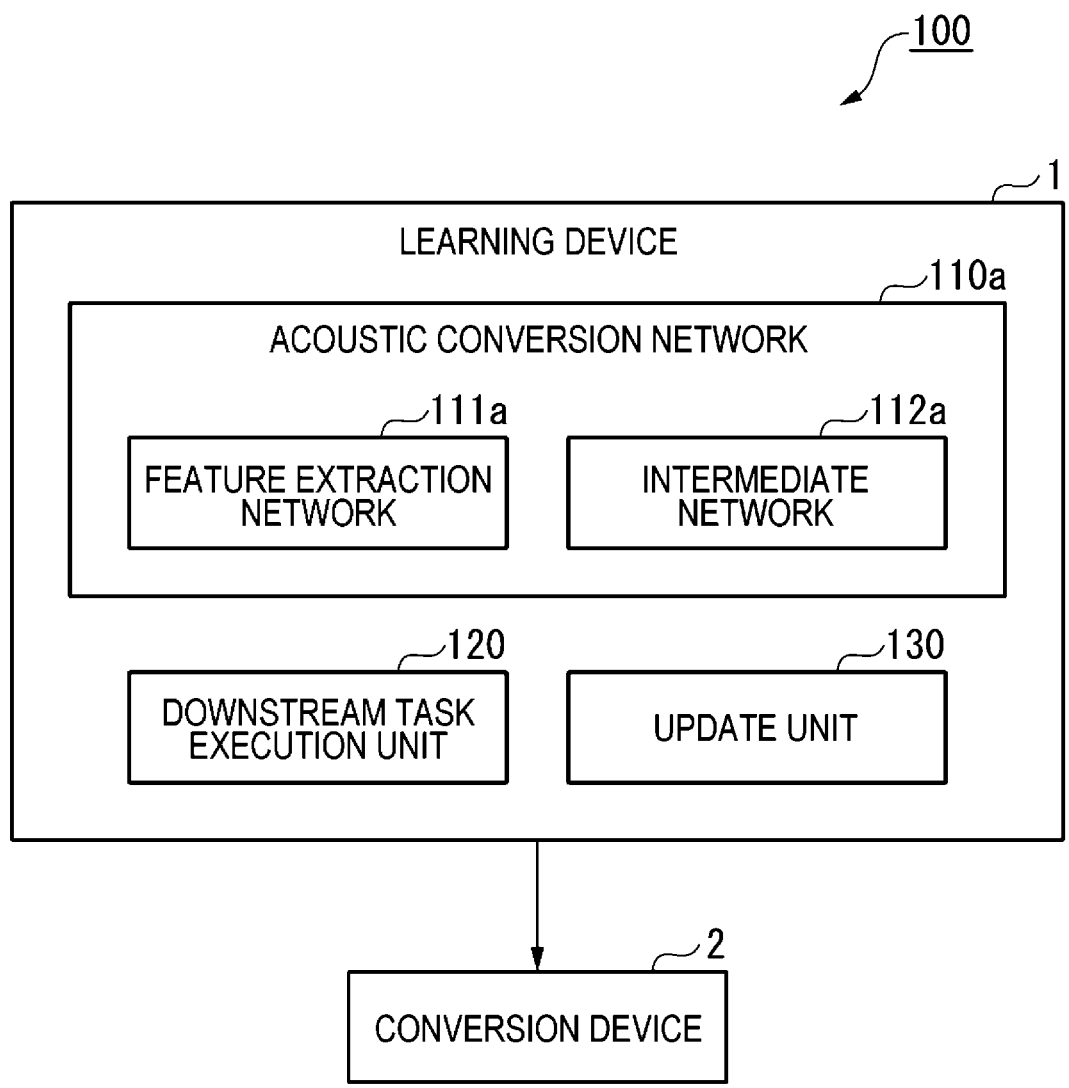
FIG. 13 is a diagram illustrating an example of a configuration of a learning device including an acoustic conversion network according to the modification.

FIG. 13 is a diagram illustrating an example of a configuration of the learning device 1 including, instead of the acoustic conversion network 110, an acoustic conversion network 110a according to the modification. In the example in FIG. 13, the learning device 1 includes the acoustic conversion network 110a instead of the acoustic conversion network 110.

The acoustic conversion network 110a includes the feature extraction network 111a and an intermediate network 112a. As described above, the feature extraction network 111a is a neural network including a plurality of pairs of layers. The feature extraction network 111a acquires a plurality of intermediate feature tensors. More specifically, the feature extraction network 111a outputs, as one intermediate feature tensor, an output from each one of a plurality of pairs of layers that have been determined in advance and are different from each other. The plurality of pairs of layers is, for example, two pairs of layers.

The intermediate network 112a executes time unification processing on each intermediate feature tensor output from the feature extraction network 111a. A plurality of intermediate feature tensors output from the feature extraction network 111a are output individually from different pairs of layers, and are not necessarily the same in the number of elements in the time direction. The time unification processing is processing to be executed on a set of a plurality of tensors. The time unification processing is processing of making the tensors included in the set of execution targets to have the same number of elements in the time direction.

For example, in a case where the feature extraction network 111a has output a plurality of intermediate feature tensors: a tensor A1, a tensor A2, and a tensor A3, the time unification processing is executed so that all of the number of elements in the time direction of the tensor A1, the number of elements in the time direction of the tensor A2, and the number of elements in the time direction of the tensor A3 become the same.

The processing of unifying the numbers of elements in the time direction is, for example, processing of executing element count increase processing or element count reduction processing. The element count increase processing is processing of increasing the number of elements for one or more tensors included in a set of execution targets, and inputting a value obtained by interpolation to the increased element. The element count reduction processing is processing of reducing the number of elements for one or more tensors included in the set of execution targets.

The following Formula (1) expresses an example of the time unification processing.

[Math. 1]

$$\hat{z}_l = \text{flatten}(\max pool(z_l, T_o)) \quad (1)$$

Formula (1) shows that a tensor on the left side is obtained as a result of converting the number of elements in the time direction of a tensor $z_l$ into a predetermined number of elements $T_0$. As described above, the time unification processing is processing of normalization in the time direction. Thus, in a case where the tensor $z_l$ is a third-order tensor that indicates features of an acoustic time series and has time, frequency, and channel, the tensor after conversion is also a third-order tensor that indicates the features of the acoustic time series and has time, frequency, and channel. That is, in a case where the tensor to be converted is an intermediate feature tensor, the tensor after conversion by the time unification processing is also an intermediate feature tensor.

The intermediate network 112a executes the non-equivalent second-order tensor processing on each one of a plurality of intermediate feature tensors unified in length in the time direction as a result of the time unification processing. As a result of each execution of the non-equivalent second-order tensor processing, a planar tensor is obtained for each execution of the non-equivalent second-order tensor processing.

The intermediate network 112a executes combining processing. The combining processing is processing of combining a plurality of planar tensors obtained as a result of the non-equivalent second-order tensor processing. For example, in a case where three planar tensors: a tensor B1, a tensor B2, and a tensor B3 are obtained as a result of the non-equivalent second-order tensor processing, the combining processing is processing of combining the tensor B1, the tensor B2, and the tensor B3 on a predetermined axis. The predetermined axis is, for example, an axis constituted by a direct product of frequency and channel. By the combining processing, one planar tensor larger in size than each planar tensor before the combining is obtained.

The intermediate network 112a performs the vectorization processing on the planar tensor after the combining.

Figure 14:
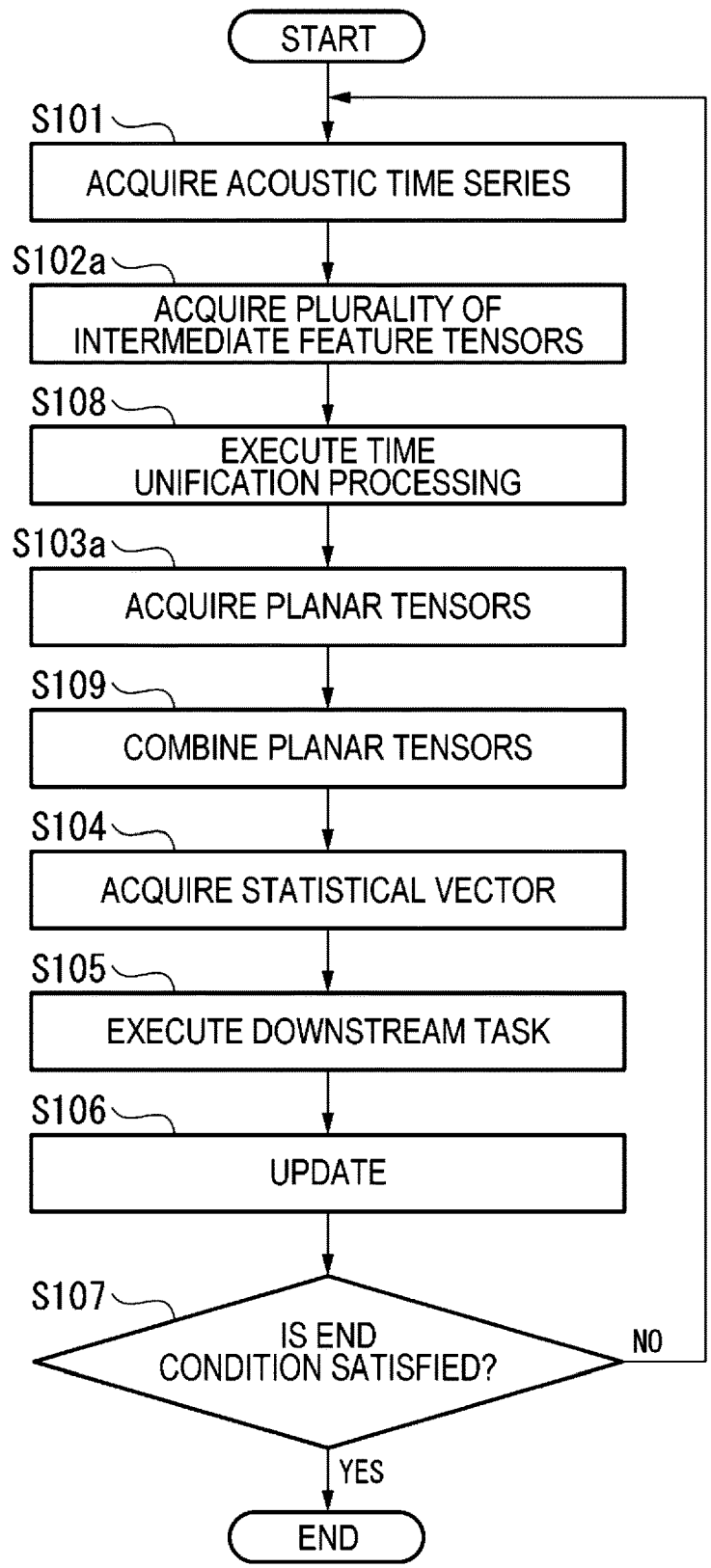
FIG. 14 is a flowchart illustrating an example of a flow of processing executed by the learning device including the acoustic conversion network according to the modification.

FIG. 14 is a flowchart illustrating an example of a flow of processing executed by the learning device 1 including the acoustic conversion network 110a according to the modification. For simplicity of description, processing similar to that in FIG. 5 is denoted by the same reference numeral as that in FIG. 5, and description thereof will be omitted.

The acoustic time series acquisition unit 101 acquires an acoustic time series (step S101). Next, the feature extraction network 111a acquires a plurality of intermediate feature tensors on the basis of the acoustic time series (step S102a). Next, the intermediate network 112a executes the time unification processing (step S108). The execution of the time unification processing causes the intermediate feature tensors obtained in step S102a to be unified in the number of elements in the time direction of.

Next, the intermediate network 112a executes the non-equivalent second-order tensor processing on each of the intermediate feature tensors in which the numbers of elements in the time direction have been unified by the time unification processing (step S103a). By the execution of the processing in step S103a, a planar tensor is obtained for each intermediate feature tensor.

Next, the intermediate network 112a executes the combining processing (step S109). The execution of the combining processing causes a plurality of the planar tensors obtained in step S103a to be combined. As a result of combining, one tensor larger than before the combining is obtained.

After step S109, processing of steps S104 to S107 is executed. The planar tensor to be subjected to the vectorization processing in step S104 is the one large tensor after the combining obtained by the processing in step S109.

Note that the time unification processing does not necessarily need to be executed. For example, in a case where the intermediate feature tensors obtained in step S102a are the same in the number of elements in the time direction, the time unification processing does not need to be executed.

In a case where the time unification processing is not executed, the intermediate network 112a executes the non-equivalent second-order tensor processing on each one of the plurality of intermediate feature tensors output from the feature extraction network 111a. As a result of each execution of the non-equivalent second-order tensor processing, a planar tensor is obtained for each execution of the non-equivalent second-order tensor processing. That is, the intermediate network 112a acquires a planar tensor for each one of the plurality of intermediate feature tensors acquired by the feature extraction network 111a.

Even in a case where the learning device 1 executes the time unification processing, the time unification processing does not necessarily need to be executed subsequent to step S102a. The time unification processing may be executed on a planar tensor obtained as a result of each execution of the non-equivalent second-order tensor processing. That is, the time unification processing may be executed on a plurality of planar tensors to be subjected to the combining processing. In such a case, a plurality of planar tensors, which have been made to have the same number of elements in the time direction by the time unification processing, are combined.

As in the time unification processing to be executed on intermediate feature tensors described above, in a case where the tensor to be converted by the time unification processing is a planar tensor, the tensor after conversion by the time unification processing is also a planar tensor.

As described above, the time unification processing does not necessarily need to be executed. Furthermore, in a case where the time unification processing is to be executed, the processing may be executed at any timing as long as the processing is executed before execution of the processing of combining planar tensors and after acquisition of a plurality of intermediate feature tensors.

<Experimental Results According to Modification>

An example of experimental results using the learning device 1 including the acoustic conversion network 110a will be described with reference to FIG. 15.

FIG. 15 is a first diagram illustrating an example of experimental results according to the modification. In the experiment, an image classification model VGGish, CNN14, which is a learning model that performs supervised learning with sound classification, and an Audio Spectrogram Transformer (AST) model were used. Each numerical value in FIG. 15 indicates an estimation accuracy.

"VGGish" means VGGish. "VGGish-Fusion #10 #15" means processing in which the processing of the feature extraction network 111 and the intermediate network 112 in VGGish is replaced with the feature extraction network 111a and the intermediate network 112a, and outputs from the 10th and 15th pairs of layers of the feature extraction network 111a are used. "CNN14" means CNN14. "CNN14-Fusion #3 #6" means processing in which the processing of the feature extraction network 111 and the intermediate network 112 in CNN14 is replaced with the feature extraction network 111a and the intermediate network 112a, and outputs from the third and sixth pairs of layers of the feature extraction network 111a are used.

"AST" means AST. "AST-Fusion #5 #12" means processing in which the processing of the feature extraction network 111 and the intermediate network 112 in AST is replaced with the feature extraction network 111a and the intermediate network 112a, and outputs from the 5th and 12th pairs of layers of the feature extraction network 111a are used.

"ESC-50" is an environmental sound identification task. "SER tasks" indicates an acoustic event recognition task. "ESC-50" and "US8K" are both a type of "SER tasks". "VC1" indicates VoxCeleb1, which is a speaker identification task. "VF" indicates VoxForge, which is a speech language identification task. "CRM-D" indicates CREMA-D, which is a speech voice emotion recognition task. "NOSS tasks" indicates a non-semantic speech task. "SPCV2", "VC1", "VF", and "CRM-D" are all a type of "NOSS tasks". "GTZAN" indicates a music genre classification task. "Music tasks" indicates a task related to music. "GTZAN", "NSynth", and "Surge" are all a type of "Music tasks".

"Avg." indicates an average of estimation accuracy. The results in FIG. 15 show that, in all of "VGGish", "CNN14", and "AST", the estimation accuracy is higher in a case where the feature extraction network 111a and the intermediate network 112a are used than in a case where the feature extraction network 111a and the intermediate network 112a are not used.

Figure 16:
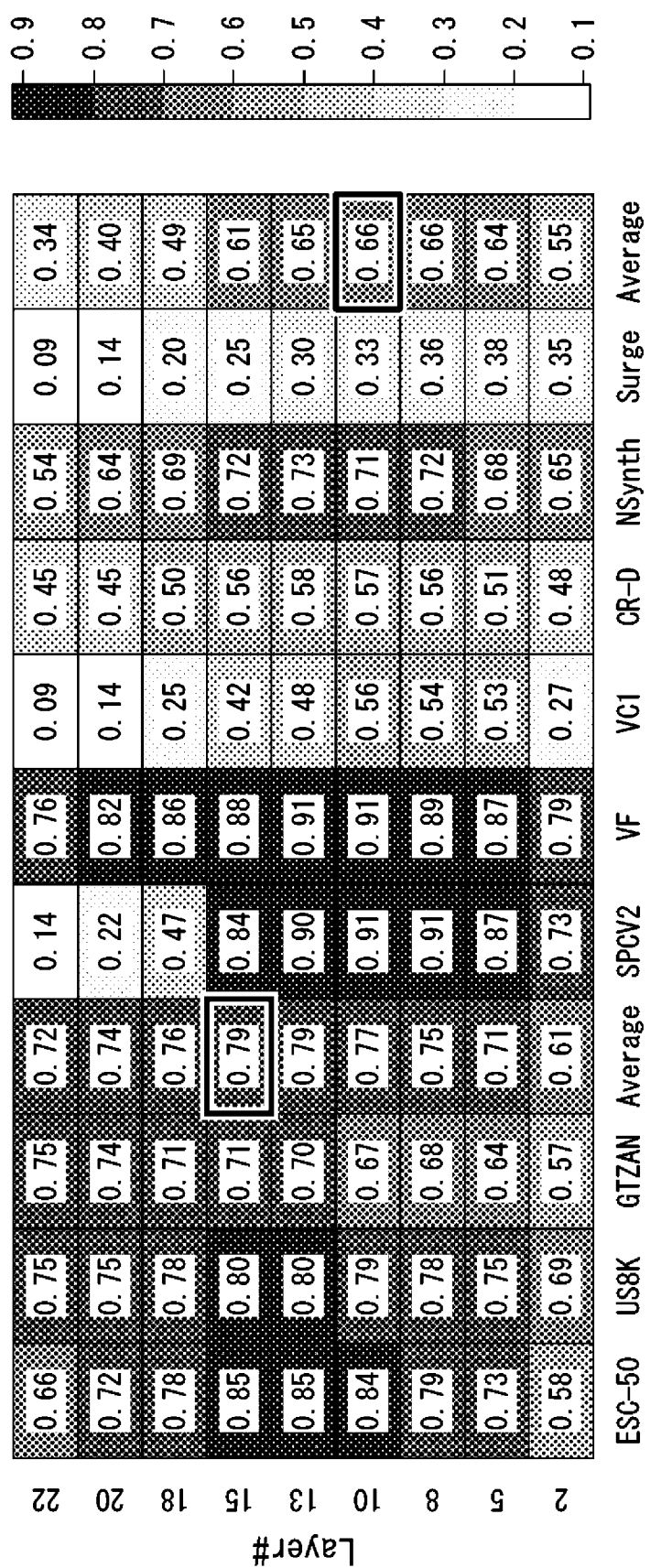
FIG. 16 is a second diagram illustrating an example of an experimental result according to the modification.

FIG. 16 is a second diagram illustrating an example of an experimental result according to the modification. A horizontal axis in FIG. 16 represents downstream tasks. A vertical axis in FIG. 16 represents pair of layers included in "VGGish-Fusion #10 #15" used in the experiment. FIG. 16 illustrates, for each pair of layers, the estimation accuracy for the downstream task in a case where only an output from the target pair of layers is used as an intermediate feature tensor. The closer to 1, the higher the estimation accuracy. FIG. 16 shows that, for example, the estimation accuracy for "ESC-50" is 85% in a case where only an output from the 15th pair of layers is used as an intermediate feature tensor.

As described above, FIG. 16 shows that the pair of layers that output an intermediate feature tensor with a higher estimation accuracy differs depending on the downstream task. FIG. 16 illustrates that it is therefore preferable to use intermediate feature tensors of a plurality of pairs of layers in order to obtain a mathematical model for obtaining estimation accuracy higher than or equal to a predetermined accuracy for a plurality of downstream tasks.

For example, FIG. 16 illustrates that a mathematical model with a high estimation accuracy for three downstream tasks: "ESC-50", "US8K", and "GTZAN" is to use the intermediate feature tensor of the 15th pair of layers. Furthermore, FIG. 16 shows that, for example, a mathematical model with a high estimation accuracy for six downstream tasks: "SPCV2", "VF", "VC1", "CR-D", "NSynth", and "Surge" is to use the intermediate feature tensor of the 10th pair of layers.

As described above, using intermediate feature tensors of a plurality of pairs of layers increases the estimation accuracy for the plurality of downstream tasks. Therefore, the learning device 1 including the acoustic conversion network 110a according to the modification can reduce the frequency at which an execution result of a downstream task does not satisfy a predetermined criterion for a plurality of downstream tasks.

Note that, in the acoustic conversion network 110 and the acoustic conversion network 110a, a statistical vector does not necessarily need to be acquired. Even in a case where the statistical vector cannot be obtained in the acoustic conversion network 110 and the acoustic conversion network 110a, as long as the planar tensor is obtained, it is possible to reduce the frequency at which an execution result of a downstream task does not satisfy a predetermined criterion because it is not necessary to calculate the statistic when only one element on the time axis is handled in a task of processing a short-time acoustic signal.

The description that it is not necessary to calculate the statistic when only one element on the time axis is handled in a task of processing a short-time acoustic signal will be described in more detail. For example, in a case where the downstream task is a task of searching for an event that occurs at a certain time, identification processing is performed for each time frame, and thus, statistical processing is not required. As described above, for example, in a case where the downstream task is a task in which a short-time acoustic signal is handled, the number of elements on time axis is one, and thus it is not necessary to take statistics. In this way, the statistical vector may not necessarily be acquired as long as the planar tensor is obtained. Therefore, even in a case where a statistical vector cannot be obtained, as long as a planar tensor is obtained, it is possible to reduce the frequency at which an execution result of a downstream task does not satisfy a predetermined criterion.

Note that the feature extraction network 111*a* is also an example of the feature extraction unit.

Each of the learning device 1 and the conversion device 2 may be implemented using a plurality of information processing devices communicably connected via a network. In this case, the functional units included in each of the learning device 1 and the conversion device 2 may be implemented in a distributed manner in the plurality of information processing devices.

Note that the learning device 1 and the conversion device 2 do not necessarily need to be mounted as different devices. The learning device 1 and the conversion device 2 may be implemented as one device having both functions, for example.

All or some of the functions of the acoustic time series conversion system 100, the learning device 1, and the conversion device 2 may be implemented by using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, or a CD-ROM or a storage device such as a hard disk built in a computer system. The program may be transmitted via an electrical communication line.

Although the embodiment of the present invention has been described in detail with reference to the drawings, specific configurations are not limited to the embodiment, and include design and the like within the scope of the present invention without departing from the gist of the present invention.

REFERENCE SIGNS LIST

100 Acoustic time series conversion system
1 Learning device
2 Conversion device
11 Control unit
12 Input unit
13 Communication unit
14 Storage unit
15 Output unit
101 Acoustic time series acquisition unit
110 Acoustic conversion network
111, 111*a* Feature extraction network
112, 112*a* Intermediate network
120 Downstream task execution unit
130 Update unit
140 Storage control unit
150 Communication control unit
160 Output control unit
21 Control unit
22 Input unit
23 Communication unit
24 Storage unit
25 Output unit
210 Conversion target acquisition unit
220 Conversion unit
230 Storage control unit
240 Communication control unit
250 Output control unit
91 Processor
92 Memory
93 Processor
94 Memory

The invention claimed is:

1. A learning device comprising:

a processor includes a neural network that converts an acoustic time series that is a time series representing a sound into feature data that is information regarding the sound obtained on the basis of the acoustic time series and is information expressed in a predetermined format required by a downstream task; and a storage medium having computer program instructions stored thereon, wherein the computer program instruction, when executed by the processor, perform processing of:

updating the neural network on the basis of an execution result of the downstream task using the feature data, in which the neural network:

converts an input acoustic time series into an intermediate feature tensor that is a third-order tensor that indicates features of the acoustic time series and has time, frequency, and channel; and the neural network includes an intermediate network that executes non-equivalent second-order tensor processing of converting a representation of the intermediate feature tensor into a representation of a planar tensor that is a second-order tensor having time and direct product amounts that are amounts indicating a direct product of frequency and channel, and vectorization processing of acquiring, for each direct product amount of the planar tensor, a one-dimensional vector indicating a statistic in a time axis direction of each direct product amount as the feature data.

2. The learning device according to claim 1, wherein the statistic is either an average value or a maximum value.

3. The learning device according to claim 1, wherein the feature data is a one-dimensional vector of a vector sum of a one-dimensional vector indicating, for each direct product amount of the planar tensor, an average value in the time axis direction of each direct product amount and a one-dimensional vector indicating, for each direct product amount of the planar tensor, a maximum value in the time axis direction of each direct product amount.

4. The learning device according to claim 1, wherein a non-equivalent second-order tensor processing execution unit updates the planar tensor with a mathematical model of machine learning.

5. A conversion device comprising:

a processor and a storage medium having computer program instructions stored thereon, wherein the computer program instruction, when executed by the processor, perform processing of:

acquiring an acoustic time series that is a time series representing a sound; and converting, into feature data, the acoustic time series acquired by the acquiring using a trained neural network obtained by learning by a learning device, a learning device comprising: a processor includes a neural network that converts an acoustic time series that is a time series representing a sound into feature data that is information regarding the sound obtained on the basis of the acoustic time series and is information expressed in a predetermined format required by a downstream task; and a storage medium having computer program instructions stored thereon, wherein the computer program instruction, when executed by the processor, perform processing of: updating the neural network on the basis of an execution result of the downstream task using the feature data, in which the neural network converts an input acoustic time series into an intermediate feature tensor that is a third-order tensor that indicates features of the acoustic time series and has time, frequency, and channel; and the neural network includes an intermediate network that executes non-equivalent second-order tensor processing of converting a representation of the intermediate feature tensor into a representation of a planar tensor that is a second-order tensor having time and direct product amounts that are amounts indicating a direct product of frequency and channel, and vectorization processing of acquiring, for each direct product amount of the planar tensor, a one-dimensional vector indicating a statistic in a time axis direction of each direct product amount as the feature data.

6. A learning method executed by a learning device comprising: a processor includes a neural network that converts an acoustic time series that is a time series representing a sound into feature data that is information regarding the sound obtained on the basis of the acoustic time series and is information expressed in a predetermined format required by a downstream task; and a storage medium having computer program instructions stored thereon, wherein the computer program instruction, when executed by the processor, perform processing of: updating the neural network on the basis of an execution result of the downstream task using the feature data, in which the neural network converts an input acoustic time series into an intermediate feature tensor that is a third-order tensor that indicates features of the acoustic time series and has time, frequency, and channel; and the neural network includes an intermediate network that executes non-equivalent second-order tensor processing of converting a representation of the intermediate feature tensor into a representation of a planar tensor that is a second-order tensor having time and direct product amounts that are amounts indicating a direct product of frequency and channel, and vectorization processing of acquiring, for each direct product amount of the planar tensor, a one-dimensional vector indicating a statistic in a time axis direction of each direct product amount as the feature data,
the learning method comprising:
converting an input acoustic time series into an intermediate feature tensor that is a third-order tensor that indicates features of the acoustic time series and has time, frequency, and channel;
converting a representation of the intermediate feature tensor into a representation of a planar tensor that is a second-order tensor having time and direct product amounts that are amounts indicating a direct product of frequency and channel; and
acquiring, for each direct product amount of the planar tensor, a one-dimensional vector indicating a statistic in a time axis direction of each direct product amount as the feature data.

7. A non-transitory computer readable medium which stores a program for causing a computer to function as the learning device according to claim 1.

8. A non-transitory computer readable medium which stores a program for causing a computer to function as the conversion device according to claim 5.

9. A learning device comprising:
a processor includes a neural network that converts an acoustic time series that is a time series representing a sound into feature data that is information regarding the sound obtained on the basis of the acoustic time series and is information expressed in a predetermined format required by a downstream task; and
a storage medium having computer program instructions stored thereon, wherein the computer program instruction, when executed by the processor, perform processing of:
updating the neural network on the basis of an execution result of the downstream task using the feature data,
in which the neural network:
acquires, on the basis of an input acoustic time series, an intermediate feature tensor that is a third-order tensor that indicates features of the acoustic time series and has time, frequency, and channel; and
the neural network includes an intermediate network that executes non-equivalent second-order tensor processing of converting a representation of the intermediate feature tensor into a representation of a planar tensor that is a second-order tensor having time and direct product amounts that are amounts indicating a direct product of frequency and channel.

10. The learning device according to claim 9, wherein
a plurality of intermediate feature tensors are acquired by the acquiring, and
the intermediate network acquires the planar tensor for each one of a plurality of the intermediate feature tensors.

11. The learning device according to claim 10, wherein the intermediate network executes:
combining processing of combining a plurality of the planar tensors; and
vectorization processing of acquiring, for each direct product amount of a combined planar tensor obtained by the combining processing, a one-dimensional vector indicating a statistic in a time axis direction of each direct product amount as the feature data.

12. The learning device according to claim 10, wherein the intermediate network executes processing of making a plurality of the intermediate feature tensors to have the same number of elements in a time direction.

13. The learning device according to claim 10, wherein the intermediate network executes processing of making a plurality of the planar tensors to be subjected to the combining processing to have the same number of elements in a time direction.

* * * * *